Patented Apr. 12, 1949

2,467,341

UNITED STATES PATENT OFFICE 2,467,341

METHACRYLATE COMPOSITIONS CONTAINING COLLOIDAL SILICA

Raymond B. Seymour, Dayton, Ohio, assignor to Monsanto Chemical Company, St. Louis, Mo., a corporation of Delaware No Drawing. Application November 17, 1944, Serial No. 563,993

2 Claims. (Cl. 260—41)

The present invention relates to improved methacrylate resins and more particularly to the lower alkyl methacrylate resins containing silica in colloidal form and to a process for producing the same. This invention also provides liquid or resinous methacrylate organosols containing colloidal silica.

The use of non-colloidal silica as a filler for vinyl resins is well known. For example, in the Stose Patent No. 2,116,986 diatomaceous earth, which is practically pure silica, is employed as a filler in the manufacture of phonograph records from vinyl resins. Crushed quartz has been suggested for use as a filler in the preparation of molded electrical insulating agents from polystyrene in the Berberich Patent No. 2,333,513. Silica gel had been suggested for the same purpose for use with polymerized ethyl acrylate in the Nowak and Hofmeier Patent No. 2,209,928. In such previous applications the siliceous material was merely employed in mechanical admixture with the vinyl resin, the resin serving as a bonding material for the silica particles. That no permanent combination between the silica and the resin was formed may be shown for example, by the fact that the siliceous filler and the vinyl compound could be separated from each other by adding the filled, molded resin to a material which was a solvent for the resin, whereupon the resin dissolved to give a solution of the resin in the presence of undissolved silica particles. There was no permanent combination or dispersion of the silica particles in the vinyl resin, because the silica and the resin could be separated from each other by leaching the silica filled resin with a solvent. It is possible thereby to separate the silica from the resin and to recover both components in unchanged form by removal of the solvent.

The combinations herein disclosed, on the other hand, are not separable by leaching with a solvent. As a matter of fact, as will be pointed out below, dispersions of colloidal silica in polymeric methyl or ethyl methacrylate can be obtained which are totally insoluble in the usual solvents for the polymeric methacrylates. However, in those combinations of polymeric methacrylates and silica where the silica is present in quantity less than that which will produce insolubility, no separation of silica and polymeric methacrylate takes place when the resins are dissolved in suitable solvents. Indeed, the solvent may be evaporated and the silica containing resin recovered in the same form in which it existed prior to solution.

Accordingly, previously known mechanical admixtures of vinyl resins and non-colloidal siliceous materials could not be employed to obtain homogeneous, smooth, cast films; for in casting the mixtures from solutions the silica separated out to give heterogeneous, brittle films that were characterized by a rough surface and lack of clarity. Molded pieces prepared from mechanical admixtures of a vinyl resin and silica likewise lacked homogeneity. Hence, in spite of the known favorable heat-resisting and electrical-insulating properties of silica, the prior art did not know how to incorporate it into a resinous material without incurring thereby a loss of clarity, flexibility and smoothness in the resulting products.

In the prior art products, there was no true combination of the ingredients, each member of the aggregation retaining its own properties. In the case of the present products, the silica, being colloidally or molecularly associated with the molecules of the resin, has not lost its colloidal character, and hence imparts valuable properties to the methacrylate resin itself, as will be pointed out in detail below.

I have found that when I combine a lower alkyl methacrylate either in the monomeric or polymeric form with a siliceous material which is in sol form, I am able to prepare a colloidal silica-containing liquid or resinous organosol which may be cast or polymerized into flexible, transparent, homogeneous films or molded under heat and pressure to yield substantially clear, transparent molded pieces of good mechanical properties and very high resistance to heat and solvents. I may use an aquasol or an alcohol sol of silica, for example, the sols disclosed in the Marshall Patents Nos. 2,285,449, 2,356,773 and 2,356,774, particularly a silica sol in a monohydric lower aliphatic alcohol, i. e., an alcohol of from 1 to 5 carbon atoms or a mixture of such alcohols. There may also be employed the silica sols made by the method disclosed in U. S. Patent No. 2,244,325 and in the Neudlinger Patent No. 1,835,420.

The silica sols employed herein are composed of colloidal particles of $SiO_2$ having a size ranging downwardly from about 600 Å units. By the process disclosed in the Marshall Patent No. 2,285,449, referred to above, the colloidal particles are generally needle-like in structure, the diameter thereof being in the neighborhood of 35 Å. Larger colloidal particles may be formed from the needle-like particles by a lengthening of the chain of molecules comprising the particle. The larger particles in the 600 Å range are probably composed of closely knit bundles of the fibrous or needle-like variety.

The silica sol may be incorporated into the resin in various ways. I may add the sol to the monomeric lower alkyl methacrylate or a mixture of the same with a monomer which is copolymerizable therewith, remove any alcohol by distillation, and then polymerize the resulting organosol by any of the known polymerizing procedures, i. e., by polymerization in mass, in emulsion, in suspension, or in solution. Polymerization may be carried out with or without the use of polymerization catalysts. Or, if desired, the mixture of monomer and aquasol or alcohol sol may be polymerized directly, in which case the water or alcohol is removed from the polymerization product during or subsequent to the polymerizing step. The silica sol may also be added to the polymeric methacrylate or to an interpolymer of the lower alkyl methacrylate. This may be effected by dissolving the polymeric material, adding the sol to the resulting solution and then removing the alcohol and, if desired, the solvent, by distillation. When employing this procedure, for many purposes removal of the solvent and the sol medium is unnecessary. For example, solutions which may be cast into films or used as coatings are obtained by dissolving a polymeric methacrylate such as polymeric methyl methacrylate in a solvent, for example, dioxane, and adding an isopropanol silica sol to the solution or adding aquasol to an emulsion of the polymer or copolymer.

When operating by any of the procedures described above, employing from, say, 2% to 70% by weight of coloidal silica (calculated at $SiO_2$) of the total weight of the methacrylate and silica, there are obtained homogeneous silica-containing materials which may be cast or molded to give clear, colorless objects or films of very good mechanical properties and high heat resistance.

Particularly valuable products are obtained by combining plasticized alkyl methacrylate resins with the silica sols. When the lower alkyl polymeric methacrylates are plasticized with such plasticizers as dibutyl phthalate, tricresyl phosphate, etc., there are obtained films which, though flexible, are undesirable for certain purposes because of their excessive tackiness. While this property is of value when the material is to be used as an adhesive, when the plasticized polymeric methacrylates are to be used in coatings or in the manufacture of films, the extreme tackiness is a distinct drawback. I have found, however, that when a silica sol, for example, a silica aquasol, is added to an emulsion of a polymeric methacrylate containing one or more of the known plasticizers, films cast from the emulsion are clear, non-tacky, tough and elastic. Attempts to incorporate ordinary silica with polymeric methacrylates by dispersing the silica in a ball mill with water and emulsifier and adding this to the emulsion of polymer have resulted in opaque, brittle resins. Evidently, the colloidal structure of the silica sol is the instrumental factor in the production of clear, flexible, siliceous polymeric methacrylates, for I have found that when even comparatively large amounts of the silica sol are added to the emulsion of polymeric methacrylate, in presence or absence of a plasticizing agent, the resulting films are substantially as clear as those prepared from polymeric methacrylates in absence of silica.

There is a gradual gradation of properties in the polymeric methacrylate films, which depends upon the quantity of silica sol employed. I have found the optimum quantity of the sol, calculated as $SiO_2$, to be from, say, 5% to 30% by weight of the combined methacrylate and silica. When the quantity of silica exceeds, say, 40% the polymethacrylate films are slightly brittle, although plasticizers may be employed to decrease the brittleness thus produced. When the quantity of silica is equal to that of the polymeric methacrylate, the resulting films are translucent, though continuous. On the other hand, films containing from, say, 6% to 25% of the silica sol are stronger, more elastic, and less tacky than plasticized or unplasticized polymethacrylate films formed in the absence of silica sol. The heat-resisting properties of the silica sol-containing films are thereby materially increased, as will be hereinafter disclosed.

While polymeric methacrylate films containing more than 30% of colloidal silica are somewhat brittle, such films are of interest as coating materials for various purposes in the electrical arts, where they may be applied to supporting surfaces. With colloidal silica contents as high as 80% to 90% by weight, the balance being a polymerized methacrylate such as polymeric methyl methacrylate, the combination can be produced in the form of extremely thin continuous films.

The present invention is further illustrated, but not limited, by the following examples:

Example 1

Various proportions of an isopropanol silica sol (containing 20% of $SiO_2$) were added to a 10% solution of polymeric methyl methacrylate in dioxane. Films which were cast from the resulting solutions were continuous and had the following properties:

| Polymer | $SiO_2$ | Nature of Film |
|---|---|---|
| *Grams* | *Grams* | |
| 100 | 0.0 | Clear. |
| 100 | 10.0 | Do. |
| 100 | 30.0 | Clear. |
| 100 | 100.0 | Translucent. |
| 100 | 200.0 | Do. |

Portions of the solutions were drum-dried, and thermal data on the dried products were determined on the copper Maquenne bar. The following values were obtained:

| Polymer | $SiO_2$ | Softening Point | Melting Point |
|---|---|---|---|
| *Grams* | *Grams* | °C. | °C. |
| 100 | 0.0 | 145 | 263 |
| 100 | 10.0 | 148 | 265 |
| 100 | 30.0 | 156 | 280 |
| 100 | 100.0 | 177 | 290+ |
| 100 | 200.0 | 180 | 290+ |

The drum-dried products were also submitted to a hot molding process. Test specimens so obtained are characterized as follows:

| Polymer | $SiO_2$ | Nature of Film |
|---|---|---|
| *Grams* | *Grams* | |
| 100 | 0.0 | Clear. |
| 100 | 10.0 | Do. |
| 100 | 30.0 | Do. |
| 100 | 100.0 | Translucent. |
| 100 | 200.0 | Not moldable. |

In order to ascertain the nature of the silica sol-polymer solutions, portions of the solutions were precipitated in 50% ethanol. The precipitated and the dried materials had the same softening and molting points as those obtained by simple drum-drying of the solutions. There was no evidence of silica in the filtrate. This shows that the silica sol is combined with the polymer in such a manner that the union is not disrupted during solution and precipitation processes and indicates a highly stable structure which is something more than the usual physical combination.

*Example 2*

100 parts of a 19% silica sol in isopropanol was added to 100 parts of monomeric ethyl methacrylate and the resulting mixture was thoroughly homogenized by stirring. The isopropanol was then removed from the mixture by distillation under reduced pressure. A stable organosol was thus produced. The silica-containing monomeric ethyl methacrylate was then allowed to stand at a temperature of from 90° C. to 100° C. until polymerization was complete. There was thus obtained a hard, transparent, resinous mass which was insoluble in the cistomary organic solvents and which was characterized by a degree of heat-resistance which greatly exceeded that of polymeric ethyl methacrylate prepared in the absence of the silica sol.

*Example 3*

A mixture consisting of 100 g. of methyl methacrylate, 40 g. of dibutyl phthalate, 0.02 g. of potassium persulfate, 210 g. of water and 6.2 g. of a wetting agent known to the trade as "Santomerse D" (a sodium alkyl benzene sulfonate) was emulsified by agitation for a period of one hour while heating to the boiling point under reflux. A silica aquasol containing 11% $SiO_2$ was added to the emulsion in the proportions noted below and films were cast from the colloidal silica-methyl methacrylate emulsion. In 3 separate experiments, carried out as above, 100 parts by weight of methyl methacrylate emulsion were used in each test with the quantity of silica aquasol (11% $SiO_2$) given below and films were cast from each of the test samples. The properties of the dried, cast films are indicated below:

| Test No. | Silica Aquasol (pts. by wt.) | Nature of Film |
|---|---|---|
| 1 | 0.00 | Rough, tacky film. |
| 2 | 25.00 | Somewhat tacky, smooth. |
| 3 | 37.50 | Smooth, strong film. |
| 4 | 75.00 | Very smooth, very strong film. |

*Example 4*

100 parts of a 19% silica sol in isopropanol was added to a mixture consisting of 80 parts of methyl methacrylate and 20 parts of acrylonitrile. After thoroughly homogenizing the resulting mixture by stirring, the isopropanol was removed from it by distillation under reduced pressure. A stable organosol was thus produced. The silica-containing mixture of monomeric methyl methacrylate and acrylonitrile was then allowed to stand at a temperature of from 70° C. to 80° C. until polymerization was complete. There was thus obtained a highly heat-resistant, hard, transparent resin which was insoluble in all customarily employed organic solvents. The proportion of methyl methacrylate and acrylonitrile employed in this example may be varied within wide ranges.

The inclusion of silica sol in other copolymers of methyl or ethyl methacrylate also does not affect the clarity of the same and is instrumental in improving the heat- and solvent-resistant properties thereof. Instead of incorporating the silica sol into a mixture of the monomers, the silica sol may be introduced into the copolymer resin by adding the sol to a solution of the methacrylate copolymer, substantially as described in Example 1, employing a solution of the copolymer instead of polymeric methyl methacrylate as shown in that example. Also, instead of copolymers of the methacrylates with acrylonitrile, there may be employed with the silica sol such copolymers of the lower alkyl methacrylates as those obtained by interpolymerization of a mixture of the methacrylate with such copolymerizable monomers as methyl or ethyl acrylate; methacrylonitrile; unsaturated ketones such as methyl vinyl ketone or methyl isopropenyl ketone; compounds containing at least two conjugated or non-conjugated olefinic double bonds such as butadiene, isoprene, divinylbenzene, methacrylic anhydride, diallyl succinate; vinyl esters such as vinyl acetate and vinyl chloride; vinylidene chloride; vinyl aromatic compounds such as styrene and the nuclearly or chain-substituted derivatives thereof, etc. Valuable products are also obtained by incorporating the silica sol into either monomeric mixtures or the copolymers of two different lower alkyl methacrylates, for example, methyl methacrylate and ethyl methacrylate or methyl methacrylate and butyl methacrylate, or by employing a lower alkyl methacrylate and a higher alkyl methacrylate, for example, methyl methacrylate and lauryl methacrylate or 2 - ethylhexyl methacrylate. Mixtures of the lower alkyl methacrylates and the lower or higher alkyl acrylates may be similarly employed. The lower alkyl methacrylates contemplated by the present invention include the methyl, ethyl, propyl and butyl methacrylates.

Because of the excellent thermal and physical properties of lower alkyl methacrylate polymer or interpolymers containing silica sol they are valuable for the production of extruded, cast or molded parts for the following purposes:

Electrical insulation, particularly ignition and lighting fixtures for automotive and aeronautical purposes, also switches, sockets, lamp housings, commutators, telephone parts, such as hand sets and bases, flashlight cases, lampshades, vacuum cleaners, electrical shavers, refrigerator parts, hair dryers, rectifiers, transformers, rheostats, voltage regulators, etc., steering wheels, decorative parts, knobs and handles, radio parts such as molded cases, plugs, adapters, coil forms, coaxial cable spacers, radar insulation and domes, condensers, panel boards, high frequency lead-ins, antenna loops and bases, photographic films, chemical tank lining materials, surgical instruments (which may be sterilized without distortion), etc. For certain purposes the present materials may be drawn or extruded into threads or fibers. As hereinbefore described, the present silica sol-containing lower alkyl methacrylate polymers or interpolymers are particularly valuable in the production of coating materials and cast films. Because of their ability to control the stickiness which is often developed when polymeric methacrylates are incorporated with plasticizers, the silica sols are very advantageously employed with this combination. As plasticizers may be used any non-volatile material which is known to be compatible with methacrylate resins and to have a plasticizing effect when incorporated therein.

A variety of methods may be utilized in applying the principle of my invention and the products produced thereby, the invention being limited only by the appended claims.

What I claim is:

1. The process of forming a silica organosol which comprises mixing a solution of a polyalkylmethacrylate selected from the group consisting of polymethylmethacrylate and polyethylmethacrylate in a solvent for said polyalkylmethacrylate, with an isopropanol silica sol, drying the resulting mixture and recovering a product containing from 5% to 30% by weight of silica, the balance of said product being said polyalkylmethacrylate, the amount of isopropanol silica sol employed in forming said mixture being sufficient to supply to the said product the said 5% to 30% by weight of silica, the silica in said product being inseparable upon solution of said product in a solvent for said polyalkylmethacrylate.

2. The process of forming a silica organosol which comprises mixing a solution of polymethylmethacrylate in a solvent for said polymethylmethacrylate with an isopropanol silica sol, drying the resulting mixture and recovering a product containing from 5% to 30% by weight of silica, the balance thereof being polymethylmethacrylate, the amount of isopropanol silica sol employed in forming said mixture being sufficient to supply to said product from 5% to 30% by weight of said silica the silica in said product being inseparable upon solution of said product in a solvent for said polymethylmethacrylate.

RAYMOND B. SEYMOUR.

REFERENCES CITED

The following references are of record in the file of this patent:

UNITED STATES PATENTS

| Number | Name | Date |
| --- | --- | --- |
| 2,209,928 | Nowak et al. | July 30, 1940 |
| 2,285,477 | White | June 9, 1942 |
| 2,408,656 | Kirk | Oct. 1, 1946 |